United States Patent [19]

Price

[11] 4,319,405
[45] Mar. 16, 1982

[54] LEVELING INSTRUMENT

[76] Inventor: Orville E. Price, 3186 Stingy La., Anderson, Calif. 96007

[21] Appl. No.: 117,284

[22] Filed: Jan. 31, 1980

[51] Int. Cl.³ .............................................. G01C 5/00
[52] U.S. Cl. ....................................... 33/292; 33/299
[58] Field of Search ........................... 33/290, 292, 299

[56] References Cited

U.S. PATENT DOCUMENTS

| | | |
|---|---|---|
| 280,203 | 6/1883 | McCurry . |
| 341,690 | 5/1886 | Reichenbach . |
| 383,767 | 5/1888 | Reichenbach . |
| 434,399 | 8/1890 | Paoli . |
| 691,631 | 1/1902 | Jackson . |
| 753,149 | 2/1904 | Lankford . |
| 823,373 | 6/1906 | Tatum . |
| 892,217 | 6/1908 | Brown . |
| 1,552,318 | 9/1925 | Lane . |
| 1,670,267 | 5/1928 | Mayes . |
| 2,164,051 | 6/1939 | Brunson ............................... 33/299 |
| 2,179,514 | 11/1939 | Mattis . |
| 2,453,276 | 11/1948 | Shelby . |
| 2,549,244 | 4/1951 | Schwettt . |
| 2,775,423 | 12/1956 | Strass . |
| 2,814,127 | 11/1957 | Blatchford . |
| 2,840,913 | 7/1958 | Houser . |
| 2,900,159 | 8/1959 | Mattex . |
| 3,015,167 | 1/1962 | Chapman . |
| 3,279,070 | 10/1966 | Blount et al. . |
| 3,295,811 | 1/1967 | Giwasky . |
| 3,765,764 | 10/1973 | Niss . |

OTHER PUBLICATIONS

Handy Level Sights Made from Small G Clamps, Popular Mechanics, Mar. 1946, p. 227.

Primary Examiner—Steven L. Stephan
Attorney, Agent, or Firm—Irons and Sears

[57] ABSTRACT

A leveling instrument for use in the building and construction trades comprises a sighting telescope embraced by one or more support members for sighting along horizontal distances, a spirit level frame having at least one bubble level tube mounted therein for indicating the horizontal alignment of the sighting telescope, and a leveling platform having a plurality of vertically adjustable legs for leveling the instrument on a support surface. The aforementioned components are maintained in relative alignment by means of flat planar mating surfaces without rigid mechanical connection therebetween in order to facilitate rapid assembly and disassembly of the instrument and compact storage. The sighting telescope includes a pair of intersecting crosshairs which may be manually adjusted in elevation, making it possible to sight along non-horizontal lines without physically tilting the leveling instrument as a whole. Each of the vertically adjustable legs of the instrument comprises an externally threaded shaft which engages the open end of an internally threaded tubular member, the latter being removably received in a tubular furrow member permanently embedded in the leveling platform. The sighting telescope support members are characterized by a two-part construction with fastener-recessing cavities in the base section thereof, thereby providing a substantially unobstructed flat planar base surface portion for resting smoothly on the spirit level frame.

8 Claims, 6 Drawing Figures

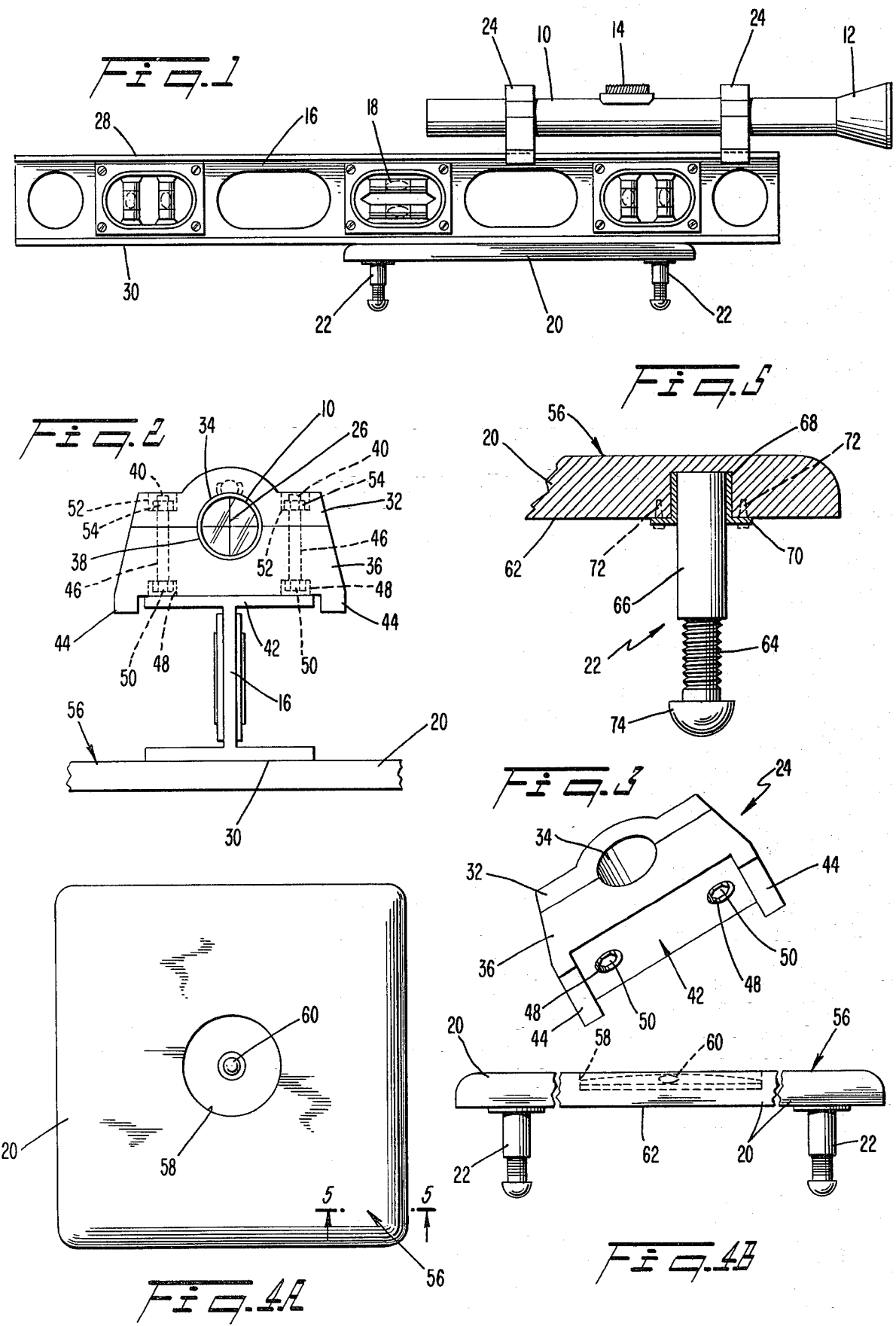

LEVELING INSTRUMENT

BACKGROUND OF THE INVENTION

1. Field of the Invention

The present invention relates to leveling instruments of the type used in the building and construction trades for determining elevations, alignments and the like.

2. Description of the Prior Art

It is frequently necessary in carpentry, masonry, construction engineering and allied fields to make use of surveying or leveling instruments in order to determine elevations or to insure alignment among a plurality of points or objects at physically separated locations. In some instances, as in the construction of walls and foundations, it is necessary to sight along a line that is as close as possible to a true horizontal. In other cases, as where a drainage ditch or sewage line must have a prescribed drop per running foot, it becomes necessary to sight along a line which has a predetermined inclination with respect to the horizontal.

While professional surveyors' transits are capable of performing the above-described functions, these instruments are usually designed to provide a level of precision that is far beyond that ordinarily required in the building and construction trades. As a consequence, instruments of this type are generally rather complicated, delicate, and expensive. The needs of carpenters, masons and other tradesman, however, call for a leveling instrument which is simple in construction and operation, rugged, and inexpensive. A further and equally important requirement is the ability of the instrument to be quickly and easily assembled and disassembled, and compactly stored, for transport from one job site to the next.

Although a number of leveling instruments have been developed for use in the building and construction trades, those of which the applicant is aware invariably fall short in one or more of the above respects. U.S. Pat. No. 892,217, for example, describes a mason's level in which a sight tube is retained by means of set screws in a pair of sockets formed in the upstanding arms of a U-shaped yoke member. The lower portion of the yoke is pivotally secured by a pivot bolt to a rectangular base which is provided with an annular track for engaging similarly shaped grooves formed in the bottom of the yoke. Threaded openings are provided near the corners of the rectangular base for receiving correspondingly threaded support legs, which enable the device to be mounted and leveled on a suitable support surface. A bubble level device is affixed by screws to the upper side of the sight tube for use in leveling the instrument. While this manner of construction produces a leveling instrument which is, according to its stated objective, simple and inexpensive, the ability of the instrument to be disassembled or "knocked down" for compact storage and transport is impaired by the necessity of loosening or removing a number of threaded fasteners including, at a minimum, the pivot bolt and the four threaded support legs which project from the base.

U.S. Pat. No. 2,900,159 describes a sighting level which includes a spirit level, a sighting tube, and a pivotally articulated support assembly terminating in a C-clamp. The sighting tube is embraced by a pair of clamps which are in turn secured to the upper portion of the spirit level frame by set screws. A similar pair of clamps secures the lower portion of the spirit level frame to the upper of two confronting circular plates which form a part of the support assembly. The lower circular plate is attached by means of a bracket and flat plate member to the C-clamp, which is intended to permit the sighting level to be mounted on a projecting beam or the like. The various components of the support assembly are pivotally interconnected by means of bolts and wing nuts so that the sighting level may be rotated in three orthogonal planes. As before, however, the ability of the instrument to be compactly stored and transported is impaired by the numerous threaded fasteners which must be loosened or removed in order to separate the sighting level into its component parts. Moreover, the use of a C-clamp as the ultimate support device for the sighting level requires the presence at the job site of an additional support member, such as a fence or a saw horse, to which the C-clamp can be affixed, and may therefore limit the versatility of the instrument.

SUMMARY OF THE INVENTION

A leveling instrument in accordance with the present invention comprises, in general, a sighting telescope for sighting along horizontal distances, a spirit level frame having parallel upper and lower flat planar surfaces and having at least one bubble level tube mounted therein for indicating the horizontal alignment of the sighting telescope, one or more support members for rigidly embracing the sighting telescope and supporting the sighting telescope horizontally on the upper surface of the spirit level frame, and a leveling platform having a flat planar top surface for carrying the spirit level frame and a bottom surface which is provided with a plurality of individually adjustable legs for supporting the leveling platform on a support surface. The sighting telescope preferably includes a pair of intersecting crosshairs and a device for manually adjusting the elevation of the crosshairs within the sighting telescope. Each sighting telescope support member has a flat planar base surface portion for resting smoothly on the upper surface of the spirit level frame, such base surface portion being bounded by a downwardly projecting flange member at each lateral edge thereof. In accordance with an important feature of the invention, there is an absence of rigid mechanical connection, other than mere abutting contact, between the flat planar base surface portion of each sighting telescope support member and the flat planar upper surface of the spirit level frame, as well as between the flat planar lower surface of the spirit level frame and the flat planar top surface of the leveling platform. By thus relying on flat planar mating surfaces to stably align the component parts of the leveling instrument, rather than on threaded fasteners or other rigid mechanical connection means, the present invention provides a leveling instrument which may be instantly assembled or disassembled and compactly stored.

Each of the individually adjustable legs carried by the bottom surface of the leveling platform may comprise an internally threaded tubular member open at one end and attached at its opposite end to the bottom surface of the leveling platform, and an externally threaded shaft for engaging at one end thereof the open end of the internally threaded tubular member. The opposite end of the externally threaded shaft is provided with a resilient tip for resting on a support surface. The bottom surface of the leveling platform may be provided with a plurality of permanently embedded furrow members in which the internally threaded tubular members are removably received, thereby allowing the adjustable legs to be quickly and simply removed from the leveling platform during the disassembly operation. The leveling platform may also be provided with a permanently affixed bubble level for affording a preliminary indication of the horizontal alignment of the leveling platform prior to placing the spirit level frame and sighting telescope thereon.

For a sighting telescope of circular cross-section, each sighting telescope support member may comprise separable upper and lower sections having semicircular recesses therein which are dimensioned to conform to the contour of the sighting telescope. The lower section includes the flat planar base surface portion and downwardly projecting flange members of the support member. When coupled together, the semicircular recesses in the upper and lower support member sections align to define a circular clamp for rigidly embracing the sighting telescope. The support member may include vertical through-holes laterally disposed on opposite sides of the aligned semicircular recesses, each through-hole passing through the upper and lower sections of the support member and terminating in an enlarged fastener head receiving cavity formed in the flat planar base surface portion of the lower section of the support member. A threaded fastener may be received in each through-hole for coupling the upper and lower sections of the support member together, the head of each fastener being recessed in a fastener head receiving cavity in order to preserve the smoothness of the flat planar base surface portion of the lower section of the support member.

BRIEF DESCRIPTION OF THE DRAWINGS

The various advantages and novel features of the present invention will be more fully apprehended from the following detailed description when read in connection with the appended drawings, in which:

FIG. 1 is a side elevational view of a leveling instrument in accordance with the present invention;

FIG. 2 is a front elevational view of the leveling instrument of FIG. 1 viewed from the left-hand end thereof, showing the details of one of the sighting telescope support members;

FIG. 3 is a bottom perspective view of one of the sighting telescope support members, showing further details thereof;

FIGS. 4A and 4B are plan and side elevational views, respectively, of the leveling platform, FIG. 4B being an enlargement of FIG. 4A with portions removed;

FIG. 5 is a partial sectional view taken along the line 5—5 in FIG. 4A, showing the details of one of the individually adjustable legs carried by the leveling platform.

Throughout the drawings, like reference numerals are used to designate like parts.

DETAILED DESCRIPTION OF THE PREFERRED EMBODIMENT

A leveling instrument constructed in accordance with the present invention is shown in a side elevational view in FIG. 1. The leveling instrument comprises, in general, a horizontally disposed sighting telescope 10 having an eyepiece 12 and a manual crosshairs adjustment 14, a horizontally disposed spirit level frame 16 having one or more horizontal bubble level tubes 18 fixedly mounted therein, and a horizontally disposed leveling platform 20 having a plurality of individually vertically adjustable legs 22 for supporting and leveling the spirit level frame 16. Two support members 24 are provided for rigidly embracing the sighting telescope 10 at different points thereon and for supporting the sighting telescope atop the spirit level frame 16 in a manner to be described shortly.

Sighting telescope 10 is of the type typically used on hunting rifles and may or may not provide magnification. Crosshairs 26 (seen in the side elevational view of FIG. 2) are provided in the optical system of the sighting telescope to increase the precision with which a marker or other target may be sighted. The sighting telescope preferably also includes a crosshairs adjustment device 14 which is used to manually vary the elevation of the intersecting crosshairs 26 within the sighting telescope for a purpose to be described hereinafter.

Spirit level frame 16 is of the standard type commonly used by builders and carpenters and includes a number of horizontally and vertically arranged bubble level tubes for ascertaining the horizontal and vertical alignment of beams and the like. For the purposes of the present invention, it is only necessary that the spirit level include one or more horizontal bubble level tubes 18. As will be more readily apparent from the front elevational view of FIG. 2, the spirit level frame has an I-beam type cross section when viewed along its length and includes flat planar upper and lower surfaces 28 and 30, respectively, which surfaces are parallel to each other.

With further reference to FIG. 2, each of the two support members 24 for the circular sighting telescope 10 will be seen to comprise a separable under section 32 and a separable lower section 36 which are preferably made of a lightweight plastic material. Upper section 32 and lower section 36 are releasably coupled together by suitable threaded fasteners 40 (shown in phantom) which may be round head stove bolts, square or hexagonal head machine bolts, or the like. The upper section 32 of the support member 24 includes a semicircular recess 34 which is dimensioned to conform to the circular contour of the sighting telescope 10. The lower section 36 includes a similar semicircular recess 38 which is likewise dimensioned to conform to the circular contour of the sighting telescope. When the upper and lower sections 32 and 36 are coupled together by means of threaded fasteners 40 in the manner shown, the two semicircular recesses 34 and 38 align to define a circular clamp for rigidly embracing the sighting telescope 10.

To enable the sighting telescope 10 to rest in a level and stable manner atop the spirit level frame 16, the lower section 36 of each support member 24 is provided with a flat planar base surface portion 42 for resting smoothly on the flat planar upper surface 28 of the spirit level frame 16. The flat planar base surface 42 is best seen in FIG. 3, where the support member 24 is illustrated in a bottom perspective view. To facilitate rapid assembly and disassembly of the leveling instrument, there is no rigid mechanical connection, other than mere abutting contact, between the flat planar base surface portion 42 of the support member and the flat planar upper surface 28 of the spirit level frame. To prevent the sighting telescope and support member assembly from slipping laterally off the flat planar upper surface 28 of the spirit level frame 16, the flat planar base surface portion 42 of each support member 24 is bounded at each of its two lateral edges by a downwardly projecting flange member 44. The flange members 44 may be formed integrally with the lower section 36 of each support member 24 and are preferably spaced apart by a distance greater than the width of the upper surface 28 of the spirit level frame 16, as shown, in order that the support members 24 may be used with spirit level frames of greater width if necessary. Gripping contact between the flange members 44 and the lateral edges of the surface 28 is unnecessary and, from the standpoint of rapid assembly and disassembly, undesirable.

Each of the sighting telescope support members 24 is provided with two vertical through-holes 46 (shown in phantom in FIG. 2) laterally disposed on opposite sides of the aligned semicircular recesses 34 and 38. As will be readily apparent from the drawing, each through-hole 46 actually comprises two separate through-hole sections which are formed, respectively, in the upper and lower sections of the support member 24. The upper and lower through-hole sections are brought into alignment when the semicircular recesses 34 and 38 are aligned to embrace the sighting telescope 10, thereby forming vertically continuous through-holes 46 which pass through the upper and lower sections of the support member 24 as shown. Each through-hole 46 terminates in an enlarged (relative to the through-hole diameter) cylindrical fastener head receiving cavity 48 formed in the flat planar base surface portion 42 of the lower section 36 of the support member 24, as illustrated in FIGS. 2 and 3. Cavities 48 are dimensioned in depth and diameter to receive the heads 50 of the fasteners 40 in a manner such that the fastener heads are recessed away from the flat planar base surface portion 42 as shown, thereby preserving the smoothness of the base surface portion 42 and assuring that a substantially unobstructed flat planar mating surface is presented for making smooth abutting contact with the flat planar upper surface 28 of the spirit level frame 16. Depending on the type of fastener 40 chosen, the diameter of cavities 48 may have to be made large enough to accommodate a socket wrench or other tool suitable for engaging the fastener head 50. If a slot-head fastener of the type engageable by a screwdriver is chosen, however, the cavities 48 need not be appreciably larger in diameter than the fastener heads themselves.

Clearly, as long as the cavities 48 are of sufficient dimensions to receive and recess the fastener heads 50 and to permit access to the tool necessary for engaging the heads, the particular geometrical shape of the cavities is immaterial. As alternatives to the cylindrical shape described, these cavities may be square, oblong, or may even take the form of open-ended slots running parallel to the depending flange members 44. The cavities 48 may, if desired, have a square or hexagonal shape conforming closely in size to a square or hexagonal fastener head, so that the fastener head 50 may be held against rotation by the cavity itself, without the use of a tool, during coupling of the support member sections 32 and 36.

Although the cavities 48 have been described as fastener head receiving cavities, it will be apparent that either end of the threaded fastener 40 may be recessed therein, provided the length of the fastener is not so great as to project beyond the flat planar base surface portion 42 of the support member 24. Ordinarily, however, the fasteners 40 will be installed with their heads 50 recessed in the cavities 48 as shown. Once the fasteners are in place, the cavities 48 may, if desired, be sealed off with flush-fitting plugs or a suitable filler material.

Further cavities 52 similar to the cavities 48 may be formed in the upper section 32 of the sighting telescope support member for recessing threaded nuts 54 or the like which are used to secure the threaded fasteners 40. The purpose of the cavities 52 is primarily to improve the appearance of the support member 24, and these cavities may be omitted if desired.

As best seen in FIG. 2, the flat planar lower surface 30 of the spirit level frame 16 rests smoothly on the flat planar top surface 56 of the leveling platform 20. To enable rapid assembly and disassembly of the leveling instrument, there is no rigid mechanical connection, other than mere abutting contact, between these two surfaces.

The details of the leveling platform 20 may now be described with reference to the plan and side elevational views of FIG. 4A and 4B, respectively, FIG. 4B being an enlargement of FIG. 4A with portions removed. As illustrated in FIG. 4A, the leveling platform is generally square in shape and may comprise a sheet of plywood, composition board or the like which is of sufficient thickness to impart rigidity to the leveling platform. Other rigid materials may be used, but the material chosen should be relatively light in weight for convenient portability. The particular shape of the leveling platform is a matter of choice, but the generally square shape shown in FIG. 4A is preferred due to its inherent stability when provided with supporting legs at each of its four corners.

As best seen in the broken side elevational view of FIG. 4B, a shallow cylindrical cavity 58 (shown in phantom) is formed in the flat planar top surface 56 of the leveling platform for recessing a circular bubble level 60 (also shown in phantom) below the surface 56. Circular bubble levels of this type are well known and are often used for leveling refrigerators and the like, where it is desirable to provide a level indication in all horizontal directions simultaneously. The circular bubble level 60 may be pressfitted into the cavity 58, adhesively bonded to the interior of the cavity 58, or secured in any other desired manner. By virtue of being entirely recessed within the cavity 58, the circular bubble level 60 does not obstruct the flat planar top surface 56 of the leveling platform. Consequently, the flat planar lower surface 30 of the spirit level frame 16 may, if desired, be placed directly over the circular bubble level 60 during the use of the leveling instrument without adversely affecting the stability or alignment of the spirit level frame and the sighting telescope carried thereby.

Provision of the circular bubble level 60 in the leveling platform 20 permits preliminary horizontal leveling adjustments to be made to the leveling platform prior to resting the spirit level frame and sighting telescope assembly thereon. After the leveling instrument has been fully assembled, as shown in FIG. 1, the horizontal bubble level tubes 18 mounted in the spirit level frame 16 permit finer horizontal leveling adjustments to be made. The recessed circular bubble level 60 may be replaced, if desired, by a number of horizontal bubble level tubes situated, for example, at the edges of the leveling platform 20.

Adjustment of the horizontal alignment of the leveling platform 20 in response to the indications provided by bubble levels 18 and 60 is carried out by individually manipulating the vertically adjustable legs 22 attached to and projecting from the bottom surface 62 of the leveling platform. Although only two legs 22 are shown in FIG. 4B, it is to be understood that in the preferred embodiment the leveling platform includes four such legs, one adjacent each corner thereof. Clearly, a greater or lesser number of legs could be provided, subject to the requirement that the leveling platform be supported thereby in a stable manner.

FIG. 5 is a partial sectional view of the leveling platform 20 showing the details of one of the vertically adjustable legs 22 and the manner in which the leg is removably attached to the bottom surface of the leveling platform. It is to be understood that the remaining legs 22 are of similar construction and are attached to the leveling platform in the same manner. The adjustable leg 22 includes an externally threaded shaft 64 which is threadably engaged at its upper end with the open lower end of an internally threaded tubular member 66. Shaft 64 and tubular member 66 are preferably metallic, but alternatively may be made of plastic materials or the like. The opposite end of the tubular member 66 is removably received in the leveling platform 20 by means of a permanently embedded tubular furrow member 68 which defines a cylindrical cavity in the bottom surface 62 of the leveling platform. The cavity defined by the furrow member 68 is dimensioned for snugly receiving the tubular member 66 in a manner permitting the tubular member to be manually inserted and removed during assembly and disassembly of the leveling instrument. An extremely tight fit is unnecessary, since the weight of the leveling platform tends to maintain the tubular member 66 in place within the furrow member cavity. Furrow member 68 includes a flange portion 70 to facilitate permanent attachment of the furrow member to the bottom surface 62 of the leveling platform by screws or tines 72 (shown in phantom) or other means.

The vertical height of the leg 22 is adjusted by manually screwing the threaded shaft 64 into or out of the internally threaded tubular member 66. The internally threaded tubular member 66 is preferably held firmly enough by the furrow member 68 to resist rotation during this operation, but if this is not the case the tubular member 66 may be held manually while the shaft 64 is rotated. By individually adjusting each of the legs 22 in this manner, the horizontal alignment of the leveling platform 20 may be adjusted until the bubble levels 60 and 18 indicate that a level horizontal condition has been reached.

A resilient tip 74 of rubber or the like is affixed to the lower end of the threaded shaft 64 of each leg 22. The resilient tip 74 provides nonslipping contact between the leg 22 and the support surface on which the leveling instrument is placed, and also prevents marring of the support surface by the leg. The latter consideration is particularly important when, for example, the support surface is the hood of an automobile.

Although the adjustable leg construction described above is preferred, many variations are possible. For example, the externally threaded shaft 64 and internally threaded tubular member may be reversed, so that the internally threaded tubular member carries the resilient tip 74 and the externally threaded shaft is received in the furrow member 68. The furrow member 68 may be provided with internal threads for engaging the externally threaded shaft if this manner of construction is chosen. Alternatively, the tubular member 66 may be dispensed with entirely and the externally threaded shaft 64 carrying the resilient tip 74 may be threaded directly into the leveling platform 20 by means of internal threads formed either in the furrow member or in the leveling platform material itself. The problem with these alternatives, however, is that complete removal of the adjustable legs from the leveling platform requires that they be individually unscrewed. By contrast, the preferred manner of construction described previously permits the adjustable legs to be quickly and completely removed from the leveling platform, without unscrewing, merely by pulling them out of the furrow member cavities.

When the leveling instrument of the present invention has been completely assembled and leveled as shown in FIG. 1, it may be used in the known manner to sight horizontal lines for determining elevations or insuring alignment among a plurality of points or objects at physically separated locations. By virtue of the crosshairs adjustment 14 on the sighting telescope 10, the instrument may also be used to sight a line which has a predetermined inclination with respect to the horizontal, as for example during the installation of drainage ditches or sewage lines which must have a prescribed drop per running foot. This may be accomplished by sighting a horizontal line to a point near the top of a marker post, marking a lower point on the marker post to represent the total drop over the distance between the leveling instrument and the marker post, and then manipulating the crosshairs adjustment 14 to center the crosshairs on the lower point marked on the marker post. The leveling instrument may now be used to establish the necessary depth of the drainage ditch or sewage line at any point between the instrument and the marker post. It should be noted that, by virtue of the crosshairs adjustment 14, it has not been necessary to physically tilt the leveling instrument as a whole during this procedure. Consequently, there is no tendency for the sighting telescope assembly or the spirit level frame to shift or slip in a longitudinal direction with respect to each other or in relation to the leveling platform, notwithstanding the absence of any rigid mechanical connection among these components. When the job has been completed, the crosshairs are readjusted to center on the original point near the top of the marker post in order to restore the instrument to true alignment for the next job.

The numerous advantages of the present leveling instrument over previously known instruments of this type will now be readily apparent. The straightforward construction of the present instrument renders it simple to operate, rugged, and inexpensive. In this connection, it should be noted that the instrument requires few specially-manufactured parts and relies upon conventional and easily available components to a maximum extent. The spirit level frame 16, as already noted, is of the sort commonly used by carpenters and requires no modification for use in the present invention. The sighting telescope 10, moreover, is of the type usually used on hunting rifles and merely requires that the support members 24 be provided in order to adapt it for use in the present instrument. It should be noted that crosshairs adjustment devices 14 are often included in sighting telescopes of this type to enable range adjustments to be made; consequently, the construction and operation of these devices is per se well known. Finally, the leveling platform 20 and vertically adjustable legs 22 are fairly simple in construction and can for the most part be made using readily available parts and materials.

A particularly important advantage of the present invention is the ability of the leveling instrument to be quickly assembled and disassembled, and compactly stored, for transport from one job site to the next. This is primarily attributable to the absence of any rigid mechanical connection, other than mere abutting contact, between the sighting telescope support members and the upper surface of the spirit level frame, as well as between the top surface of the leveling platform and the lower surface of the spirit level frame. Flat planar mating surfaces, rather than rigid mechanical connection means, are relied upon to stably align these components in the required manner. As a result, the leveling instrument may be assembled simply by setting these components on top of one another without having to install and tighten numerous threaded fasteners or the like. A further important advantage of this manner of construction is that the spirit level frame, having no fixed attachment to any other component of the leveling instrument, may be easily freed from the leveling instrument to perform its conventional functions at the job site.

Also contributing to the rapid assembly and disassembly of the leveling instrument are the vertically adjustable legs 22, which may be simply pushed into and pulled out of the leveling platform 20. Once installed, however, the screw-type construction of each leg enables vertical adjustments to be made with a high degree of precision.

The individually adjustable legs 22 permit the leveling instrument of the present invention to be placed on any roughly horizontally support surface that may be conveniently available at the job site, such as the hood of an automobile or the top surface of a drum. The lends a great deal of versatility to the instrument and avoids the need to manipulate mounting clamps, tripods or the like.

Although the present invention has been described with reference to a preferred embodiment, it will be understood that the invention is not limited to the details thereof. For example, although the sighting telescope support members are preferably of the separable two-part construction described herein, they may alternatively be unitary in construction and may even be formed integrally with the sighting telescope itself. Many other such substitutions and modifications, a few of which have been noted in the foregong detailed description, may be made without departing from the spirit and scope of the invention as defined in the appended claims.

What is claimed is:

1. A leveling instrument comprising:
   (a) a horizontally disposed sighting telescope for sighting along horizontal distances,
   (b) a horizontally disposed spirit level frame having a substantially flat planar upper surface and a substantially flat planar lower surface which is substantially parallel to said upper surface, said spirit level frame having at least one bubble level tube mounted therein for indicating the horizontal alignment thereof,
   (c) first and second support members for rigidly embracing the sighting telescope at different points thereon and for supporting said sighting telescope horizontally on the upper surface of the spirit level frame by simple abutting contact therewith, each of said support members having a substantially flat planar base surface portion for resting smoothly on the substantially flat planar upper surface of the spirit level frame, said base surface portion being bounded by a downwardly projecting flange member at each lateral edge thereof, and
   (d) a horizontally disposed leveling platform having a substantially flat planar top surface for carrying the spirit level frame by simple abutting contact therewith, the substantially flat planar lower surface of said spirit level frame resting smoothly on the substantially flat planar top surface of the leveling platform, said leveling platform further including a bottom surface having a plurality of individually vertically adjustable legs removably attached thereto for supporting the leveling platform on a support surface, each of said individually vertically adjustable legs comprising:
   (1) an internally threaded tubular member open at one end thereof and removably attached at the opposite end thereof to the bottom surface of the leveling platform, and
   (2) an externally threaded shaft for engaging at one end thereof the open end of said internally threaded tubular member, the opposite end of such externally threaded shaft having a resilient tip for resting on said support surface.

2. A leveling instrument as defined in claim 1, wherein a plurality of tubular furrow members are permanently embedded in the bottom surface of the leveling platform, and wherein the internally threaded tubular members are removably received in said tubular furrow members.

3. A leveling instrument as defined in claim 1, wherein the sighting telescope is generally circular in cross-section, and wherein each of said first and second support members comprises:
   (a) a separable upper section having a first semicircular recess therein dimensioned to conform to the contour of the sighting telescope,
   (b) a separable lower section having a second semicircular recess therein dimensioned to conform to the contour of the sighting telescope, said lower section including the substantially flat planar base surface portion and downwardly projecting flange members of the support member, and
   (c) means for releasably coupling said separable under and lower sections so that said first and second semicircular recesses align to define a circular clamp for rigidly embracing the sighting telescope.

4. A leveling instrument as defined in claim 3, wherein said support member includes first and second vertical through-holes laterally disposed on opposite sides of said aligned first and second semicircular cavities, each of said first and second vertical through-holes passing through the upper and lower sections of the support member and terminating in an enlarged fastener head receiving cavity formed in the substantially flat planar base surface portion of the lower section of said support member, and wherein said releasable coupling means comprises first and second threaded fasteners received in said first and second vertical through-holes, respectively, such that the heads of said fasteners are recessed in said fastener head receiving cavities.

5. A leveling instrument as defined in claim 1, wherein the sighting telescope includes a pair of intersecting crosshairs therein and means for adjusting the elevation of said crosshairs.

6. In a leveling instrument comprising a sighting telescope for sighting along horizontal distances and a spirit level frame having at least one bubble level tube mounted therein for indicating the horizontal alignment of the sighting telescope, said spirit level frame having a substantially flat planar upper surface and a substantially flat planar lower surface substantially parallel to said upper surface, the improvement comprising, in combination:

(a) at least one support member for supporting the sighting telescope horizontally on the upper surface of the spirit level frame by simple abutting therewith, said support member having a substantially flat planar base surface portion for resting smoothly on the substantially flat planar upper surface of the spirit level frame, said base surface portion being bounded by a downwardly projecting flange member at each lateral edge thereof, and (b) a leveling platform having a substantially flat planar top surface for carrying the spirit level frame by simple abutting contact therewith, the substantially flat planar lower surface of said spirit level frame resting smoothly on the substantially flat planar top surface of the leveling platform, said leveling platform further including a bottom surface having a plurality of tubular furrow members permanently embedded therein and a plurality of legs projecting from said tubular furrow members for supporting the level platform on a support surface, the length of said legs being individually adjustable in order to permit adjustment of the horizontal alignment of the leveling platform relative to said support surface, each of said individually adjustable legs comprising:

(1) an internally threaded tubular member open at one end thereof and removably received in one of said tubular furrow members at the opposite end thereof; and (2) an externally threaded shaft for engaging at one end thereof the open end of said internally threaded tubular member, the opposite end of said externally threaded shaft having a resilient tip for resting on said support surface.

7. A leveling instrument as defined in claim 6, wherein the sighting telescope is generally circular in cross-section, and wherein said support member comprises:

(a) a separable upper section having a first semicircular recess therein dimensioned to conform to the contour of the sighting telescope, (b) a separable lower section having a second semicircular recess therein dimensioned to conform to the contour of the sighting telescope, said lower section including the substantially flat planar base surface portion and downwardly projecting flange members of the support member, and (c) first and second threaded fasteners for releasably coupling said separable upper and lower sections so that said first and second semicircular recesses align to define a circular clamp for rigidly embracing the sighting telescope, said first and second threaded fasteners being respectively received in first and second vertical through-holes formed in said support member and laterally disposed on opposite sides of said aligned first and second semicircular cavities, each of said first and second vertical through-holes passing through the upper and lower sections of the support member and terminating in an enlarged fastener head receiving cavity formed in the substantially flat planar base surface portion of the lower section of said support member.

8. A leveling instrument as defined in claim 6, wherein the sighting telescope includes a pair of intersecting crosshairs therein and means for adjusting the elevation of said crosshairs.

* * * * *